United States Patent [19]
Coleman et al.

[11] 3,738,500
[45] June 12, 1973

[54] ROTATABLE MOUNTING FOR BOOM TYPE LOADERS

[75] Inventors: Theodore John Coleman, Raleigh; Richard Alan Jenkins, Tarboro; William Delano Ostling, Raleigh, all of N.C.

[73] Assignee: Omark Industries, Inc., Portland, Oreg.

[22] Filed: Feb. 23, 1971

[21] Appl. No.: 118,007

[52] U.S. Cl. ................... 212/66, 212/69, 214/147
[51] Int. Cl. .................................. B66c 23/84
[58] Field of Search ........................ 212/66-68, 35, 69; 214/1 CM, 147

[56] References Cited
UNITED STATES PATENTS

| | | | |
|---|---|---|---|
| 3,003,649 | 10/1961 | Przybylski | 212/66 X |
| 3,043,448 | 7/1962 | Melton | 214/1 CM |
| 2,834,480 | 5/1958 | Przybylski | 212/66 |
| 2,461,877 | 2/1949 | Brereton | 212/68 X |
| 3,112,035 | 11/1963 | Knight | 212/35 X |
| 3,589,526 | 6/1971 | Woodside et al. | 212/66 X |

FOREIGN PATENTS OR APPLICATIONS

| | | | |
|---|---|---|---|
| 859,489 | 12/1970 | Canada | 214/147 |
| 748,345 | 4/1956 | Great Britain | 212/66 |

Primary Examiner—Evon C. Blunk
Assistant Examiner—Merle F. Maffei
Attorney—Robert L. Harrington

[57] ABSTRACT

A large ring providing an outer raceway for a rotatable mounting rigidly mounted to the reinforced roof of a vehicle cab. A disc having an inner raceway on its periphery is rotatably supported on ball bearings within the outer raceway. A boom is mounted to a brace which is rigidly affixed to the disc. A column depending from the disc carries a pinion gear. Cylinders containing fluid driven pistons are rigidly mounted to the cab on either side of the pinion gear. The pistons carry gear racks that are moved past the pinion gears. The gear teeth of the rack and pinion are interengaged and by driving the rack the pinion gear and disc with boom mounted thereon are rotated.

1 Claim, 4 Drawing Figures

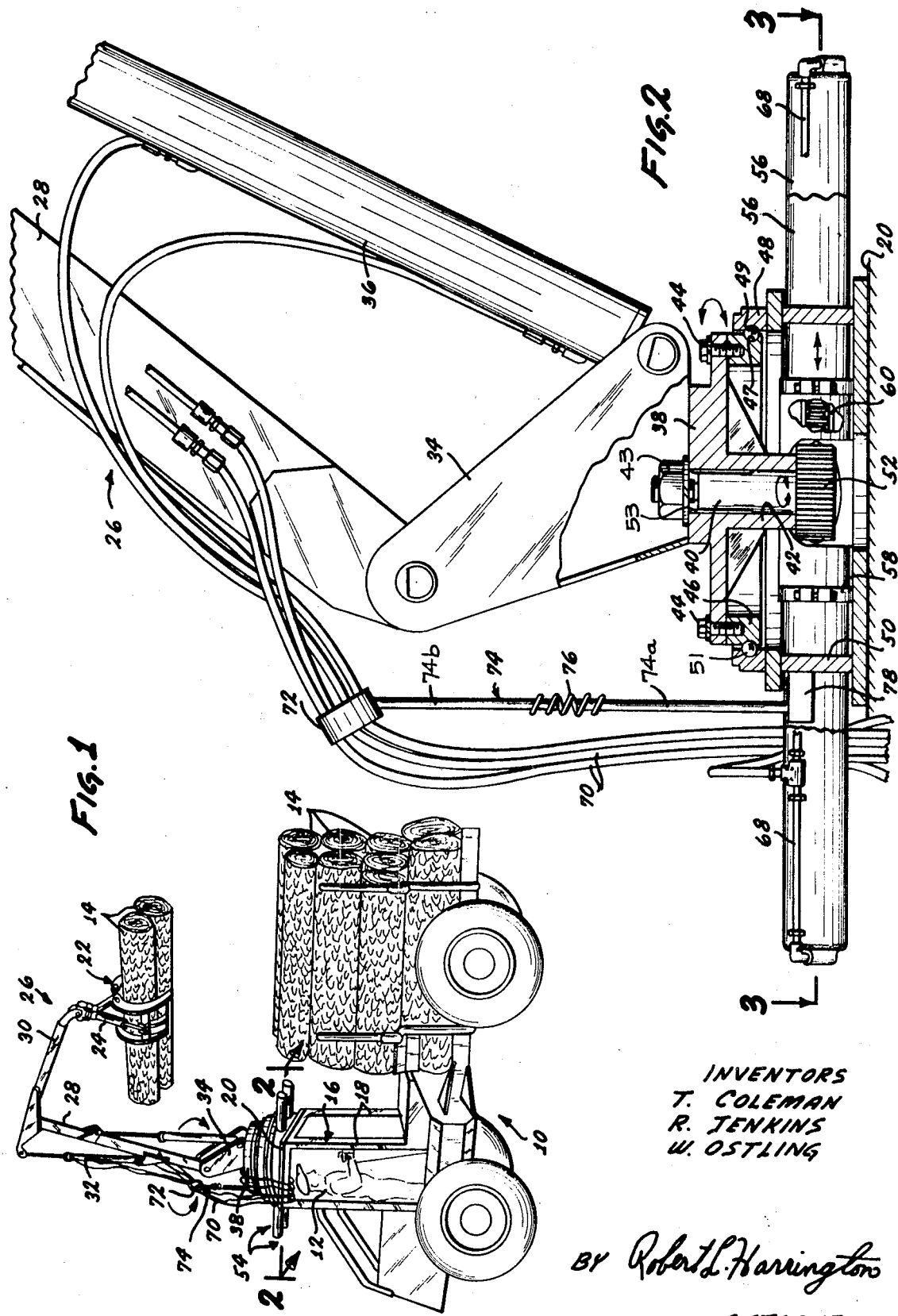

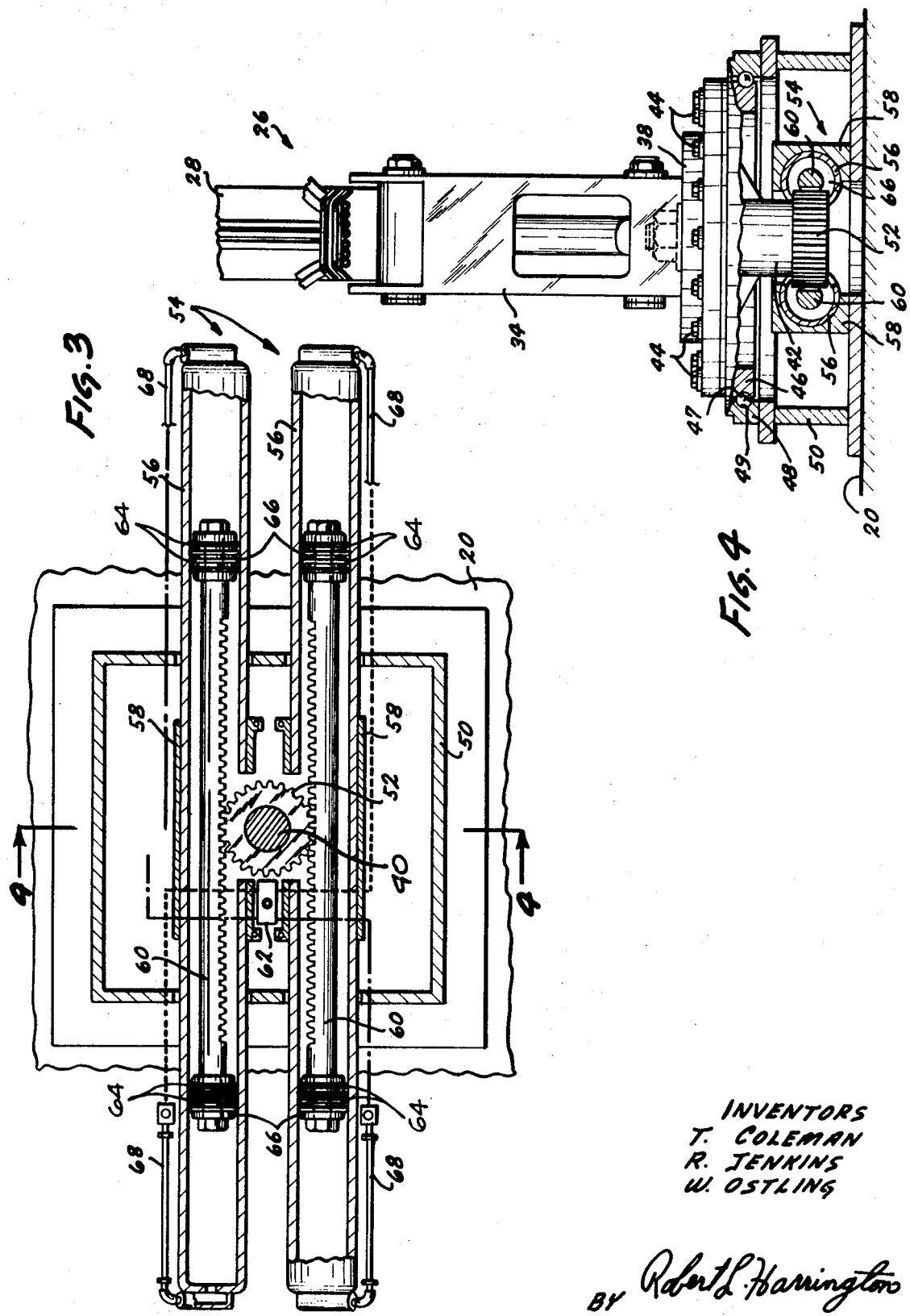

ROTATABLE MOUNTING FOR BOOM TYPE LOADERS

HISTORY

This invention relates to mounting apparatus used to rotatably mount boom type loaders to a vehicle.

In the construction and forestry industries, boom type loaders are used for moving various materials around a job site. Many other uses for boom type loaders however could be given. An important feature of boom type loaders is the ability for the vehicle to be parked in a stationary point and have the boom capable of moving various weights and types of material about the site. This includes covering substantially a 360° radius with substantial lateral and verticle reach.

The materials that are handled by such boom type loaders vary in weight from several pounds to several tons. It will be understood that extending the boom outwardly to lift heavy materials and move them angularly about the vehicle produces extreme stress on the rotatable mounting mechanism of the apparatus. One form of mounting mechanism comprises the use of a long tubular column which is rotatably supported in a housing several feet in depth whereby the stress can be offset with the leverage provided by the column length. However, it will be understood that such a mounting apparatus requires the boom to be pivoted in a plane substantially above the truck bed with the space below occupied by the column.

It has been found that in certain applications the column support mounted on the truck bed restricts the view of the operator and significantly hampers his operating ability. See for example the skidder shown in FIG. 1 of the drawings which is moved from place to place at a logging site to pick up small bunches of logs. A column mounted behind the cab restricts the operators view from the cab where controls are located for optimum convenience. Many other instances could be cited where the column type mounting is not suitable.

Another known means for mounting the boom uses an outer stationary ring which rotatably supports an inner ring. A peripheral rim on the inside of the inner ring has gear teeth which are interengaged with gear teeth on the shaft of a motor. The boom is mounted to the inner ring and controllably rotated by the motor. Driving the inner ring in the manner described is less desirable than the column type mounting from the standpoint of cost. This cost is generated by structure necessary to withstand the stresses encountered. Increased demands on the motor also requires expensive components. Thus this latter type of mounting is primarily used where column type mountings cannot be used.

The present invention is believed to provide a substantial improvement over either of the devices described above. This is accomplished by rotatably mounting a disc in an outer ring similar to that described above. A spindle depends from the center of the disc and contains gear teeth, thus forming a pinion gear. The pinion gear is engaged with the gear teeth of a gear rack that is driven by a hydraulic actuated piston. The resulting apparatus is relatively inexpensive to construct. It is also reliable in its operation, compact in its height requirements and provides all the advantages of maneuverability of prior mounting apparatus.

The invention and its advantages are more specifically described in the following detailed description and drawings wherein:

FIG. 1 illustrates a logging vehicle on which is mounted a grapple type loading boom employing apparatus constructed in accordance with the present invention;

FIG. 2 is an enlarged view of the mounting apparatus taken on section lines 2—2 of FIG. 1;

FIG. 3 is a section view taken on section lines 3—3 of FIG. 2; and

FIG. 4 is a section view taken on section lines 4—4 of FIG. 3.

Referring to the drawings, FIG. 1 illustrates a vehicle 10 commonly used by loggers and referred to as a skidder. It is used for loading cut length logs 14 and carrying them to a central loading dock for loading onto large trucks. Because of the numerous stops and pickups that are made it is desirable for the controls of the grapple to be in the cab 16 with the vehicle controls. This allows the operator 12 to quickly move from one set of controls to another without having to get out of the cab. As previously explained, it is common for skidders having grapple type loaders mounted thereon for the loader to be mounted on a column type assembly located immediately behind the vehicle cab. In such a position the view of the operator is restricted making the loading operation cumbersome.

The cab 16 of the logging vehicle 10 has a solid roof 20 supported on strong upright posts 18. It will be understood that conventional vehicles are generally not designed with a roof capable of carrying heavy loads and will have to be reinforced for purposes contemplated herein.

The operation of the illustrated grapple loader is common to the industry and is thus very generally described as follows: The grapple 22 is maneuvered through cylinder 24 for opening and closing the jaws of the grapple. The articulated boom 26 is comprised of a main boom section 28 and an outer boom section 30. This outer boom section is pivotally connected to the main boom section and manipulated through a hydraulic actuated cylinder 32. The main boom section 28 is supported on a brace 34 and is pivoted in a verticle plane thereon by hydraulic actuated cylinder 36. Thus it will be seen that the grapple can be extended downwardly, upwardly, outwardly, etc., by maneuvering the cylinders 32 and 36. It is essential however that the boom also be maneuverable rotatably about the vehicle.

The manner of mounting the brace 34 to the cab roof 20 whereby the required rotatable function can be accomplished in accordance with the present invention is shown most clearly in FIGS. 2 through 4. The main brace 34 is secured to a disc shaped plate 38, e.g., by welding. As shown in FIG. 2 the plate has a central opening around which a collar 42 is provided. A spindle bolt 40 is inserted through the opening and collar, and securely held in place by nut 43. The plate 38 is bolted by bolts 44 to a ring 46 with its outer edge forming an inner race 47. The ring 46 is supported by ball bearings 51 trapped between the inner race 47 and an outer race 49 on the inside edge of a stationary outer ring 48. The outer ring is rigidly affixed to a cylindrical housing 50 which in turn is solidly affixed to the roof 20 of the cab 16. The head of this spindle bolt 40 is provided with gear teeth and functions as a pinion gear 52.

A spline 53 between the bolt 40 and the collar 42 prevents slippage of the spindle bolt 40 within the collar and thus insures turning of plate 38 with turning of the pinion gear 52.

Hydraulic cylinders 54 are mounted to the roof of the cab. The cylinders may be bolted directly to the cab or with the aid of brackets 58 (See FIG. 4). Cylinders 56 each contain a pair of pistons 66 between which is carried a gear rack 60. Conduits 68 connected to each end of the cylinders carry liquid that is pumped in response to control unit 62 for forcing the gear rack 60 to selected positions within the cylinder. Sealing rings 64 on the pistons contain the liquid in the ends of the cylinders and prevents fluid from escaping into the area occupied by the gear rack. The gear racks are oppositely and cooperatively driven whereby the interengaging gear teeth of the gear rack and pinion gear serve to cooperatively, rotatably and selectively drive the pinion gear.

As most clearly shown in FIG. 2 liquid pressure lines 70 used for driving the various hydraulic cylinders 24, 32 and 36 are carried in a manner whereby entanglement of the mechanism of the rotatable mounting is avoided. This is accomplished by gathering the lines within a holding clip 72 which is suspended from an upright wand-like member 74. This wand-like member is separated in the center area and connected across the separation by a holding spring 76. The bottom section 74a of the wand is permitted to pivot about its connection 78 while the upper section 74b pivots about the spring 76. This permits the double pivoting of the wand to maintain the holding clip as near as possible in alignment with the boom mechanism which the lines held thereby service.

An attractive feature of the above described apparatus is in the ability to quickly and easily replace a worn pinion gear. Merely providing an opening in the roof of the cab gives easy access for removal of the spindle bolt 40.

It will be understood that the description of the above embodiment is for illustrative purposes only and is not intended to limit the scope of the invention. The scope of the invention is accordingly established by the claims appended hereto.

Having thus described my invention, what I claim is:

1. A mounting assembly for mounting a materials handling boom to the roof of the cab of a vehicle comprising; a mounting ring having a raceway formed on its inner edge, said mounting ring rigidly fixed to the roof of the cab, a disc like plate having a raceway formed on its outer edge mating with the raceway of the mounting ring, bearing means trapped between the raceway of the mounting ring and the raceway of the disc like plate which bearing means and mounting ring provide the sole support for the disc like plate, said disc like plate having a central opening and a collar formed around said opening, a bolt having a shank portion inserted through the central opening of the disc shaped plate to be encased by the collar, keying means between the shank of the bolt and the collar to prevent turning of said bolt relative to the collar, said bolt having a head portion at one end of the shank abutted against one end of the collar, and releasable locking means locking the bolt in a position with the head abutted against the collar and being releasable to permit sliding removal of the bolt from the collar, gear teeth forming a pinion gear on the head portion of the bolt, a gear rack having gear teeth interengaged with the pinion gear, said gear rack having piston like ends each slidably supported in a closed end of a cylindrical housing containing liquid that is fixed relative to the cab roof, sealing means preventing liquid from flowing past said piston like ends within said cylindrical housing, and motor means for selectively forcing liquid into the enclosed ends of the cylindrical housing to selectively position the piston like ends within the housing and thereby selectively force longitudinal movement of the gear rack, a mounting bracket fixed to said disc like plate supporting a materials handling boom, said materials handling boom being selectively rotated in a horizontal plane by rotation of the disc like plate through the engagement of the gear rack with the pinion gear.

* * * * *